Aug. 26, 1952  A. E. PETERSON  2,608,015
FISHING POLE ATTACHMENT
Filed Jan. 5, 1948
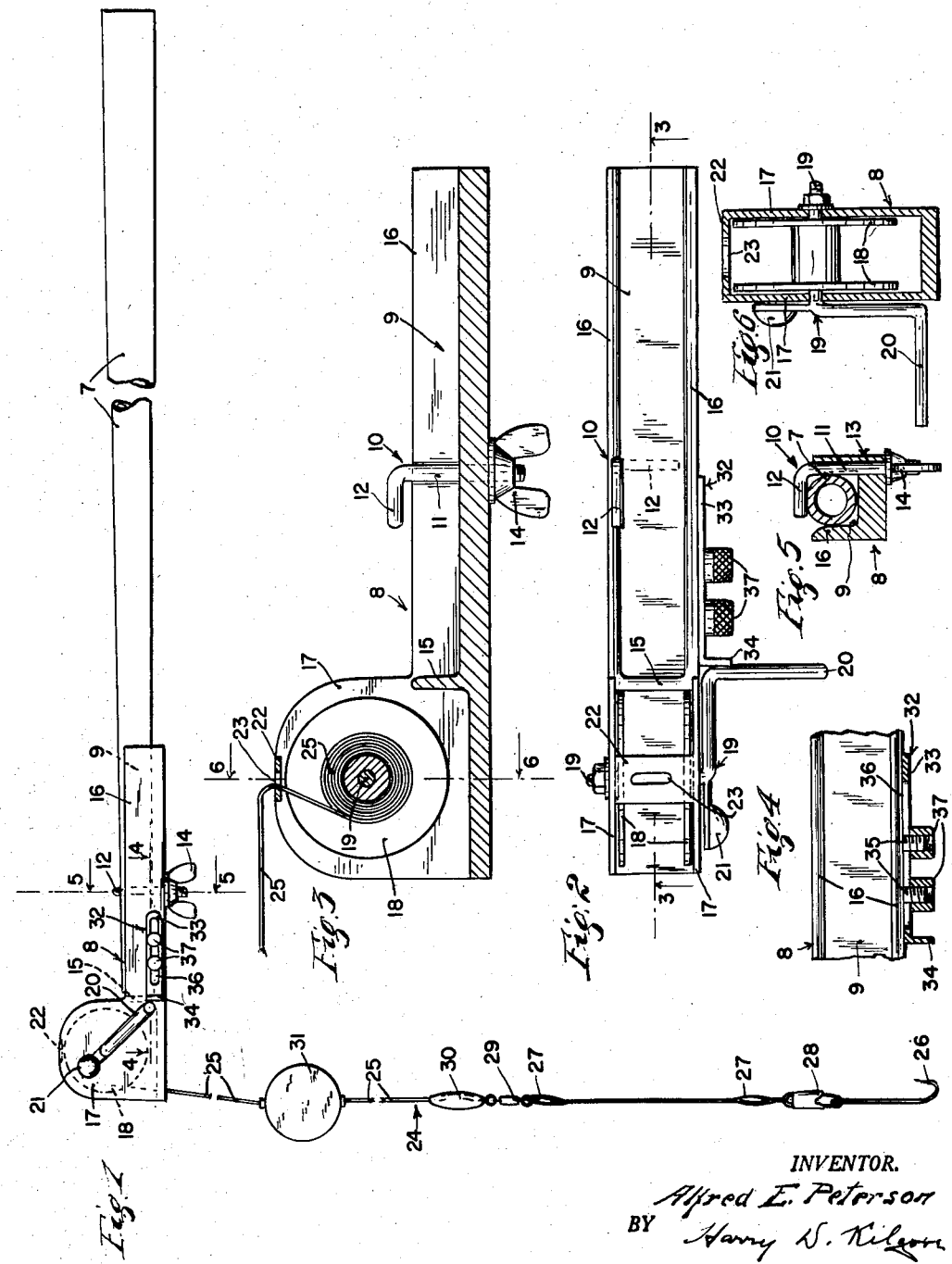
INVENTOR.
Alfred E. Peterson
BY Harry W. Kilgore
Attorney Patented Aug. 26, 1952

2,608,015

UNITED STATES PATENT OFFICE 2,608,015

FISHING POLE ATTACHMENT

Alfred E. Peterson, Minneapolis, Minn.

Application January 5, 1948, Serial No. 550

1 Claim. (Cl. 43—25)

My invention relates to improvements in fishing tackle and, more particularly, to novel means for attaching a fishing tackle assembly to the outer end portion of a pole.

It is well known that resorts and camps at fishing grounds, as a general rule, carry a line of fishing poles that they either rent or sell to their guests or permit them to use, and my fishing tackle assembly is very quickly and easily applied to the same.

The object of this invention is to eliminate the necessity of carrying a pole, such as a bamboo pole, on a fishing trip by providing novel means for attaching a fishing tackle assembly to the outer end portion of a pole. The fishing tackle assembly may be carried in a pocket, a tackle box or the like and attached to a pole upon reaching the lake, the river, or the stream where the fishing is to be done.

To the above end, generally stated, the invention consists of the novel devices and combination of devices hereinafter described and defined in the claim.

In the accompanying drawing, which illustrates the invention, like characters indicate like parts throughout the several views.

Referring to the drawing:

Fig. 1 is an elevational view of the attachment applied to the outer end portion of a pole, fragmentarily shown, and carrying a fishing tackle assembly;

Fig. 2 is a plan view of the attachment, on an enlarged scale, removed from the pole and having the fishing tackle assembly detached therefrom;

Fig. 3 is a view principally in longitudinal central section taken on the line 3—3 of Fig. 2;

Fig. 4 is a fragmentary detail view partly in plan and partly in horizontal section taken on the line 4—4 of Fig. 1, on the same scale as Fig. 2;

Fig. 5 is a detail view partly in elevation and partly in section taken on the line 5—5 of Fig. 1, on the same scale as Fig. 2; and Fig. 6 is a detail view partly in elevation and partly in section taken on the line 6—6 of Fig. 3.

The numeral 7 indicates a pole, the intermediate portion of which is broken away.

The pole attachment 8 may be made of any suitable light material such as a plastic or aluminum. This attachment 8 is in the form of a long and relatively narrow channel structure, the rear and major end portion of which affords a seat 9 for the outer end portion of the pole 7.

A clamp 10 is provided for rigidly and detachably securing the attachment 8 to the pole 7 and, as shown, is in the form of an upright round stem 11 having on its upper end a horizontal jaw 12. This stem 11 extends through a recess in one of the side flanges 16 and a hole 13 in the bottom of the seat 9, substantially at the longitudinal center thereof. The lower end portion of the stem 11 is screw-threaded and a wing-nut 14 is applied thereto and impinges the bottom of the seat 9 as a base of resistance. When the clamp 10 is in an operative position, its jaw 12 extends transversely over the pole 7 and clamps the same in the seat 9 by tightening the wing-nut 14. In the seat 9, at the inner end thereof, is a stop 15 that limits endwise movement of the pole 7 into said seat.

Forwardly of the stop 15, the side flanges 16 of the attachment 8 are materially increased in height to afford a pair of bearings 17. A spool 18, between the bearings 17, is mounted on an arbor 19 journaled in said bearings. On one of the arbors 19 is a crank 20 by which the spool 18 may be turned. A counterweight 21 is applied to the arbor 19 to balance the crank 20. The bearings 17, above the spool 18, are connected by a flat cross-tie member 22 having an elongated passageway 23 for a fishing line wound on the spool 18.

A fishing tackle assembly 24 for the attachment 8 includes a fishing line 25 extending through the passageway 23 and having one of its end portions wound on the spool 18. A hook 26 is attached to a leader 27 by a safety pin 28. This leader 27 is attached by a swivel 29 to the outer end of the fishing line 25. On the fishing line, above the swivel 29, is a sinker 30 and above said sinker is a cork float 31.

A stop 32 is provided for the crank 20 to prevent rotation of the spool 18 by outward pull on the fishing line 25. This stop 32 is in the form of an elongated plate 33 having on one of its ends an outturned lug 34. The plate 33 is adjustably secured to one of the channel flanges 16 by a pair of screw-threaded studs 35 anchored in said flange and extending outwardly through a long slot 36 in said plate. Thumb-nuts 37 on the stud 35 are provided for frictionally clamping the plate 33 onto the respective channel flange 16. By moving the stop 32 forwardly, its lug 34 may be positioned to be engaged by the crank 20 and thereby hold the spool 18 from turning.

The above described pole attachment 8, while especially intended to be attached to the outer end of a pole, may simply be held by hand while fishing over the side of a boat or from a dock.

Obviously, the pole attachment 8 and the connected fishing tackle, when not in use, may be assembled in compact form in which it is easily carried or stored in a compact space.

From what has been said, it will be understood that the invention described is capable of modifications as to details of construction and arrangement within the scope of the invention herein disclosed and claimed.

What I claim is:

In an attachment of the class described, a long narrow body having at one end portion a pair of upstanding side flanges and at its other end portions a pair of upstanding bearings, a web connecting the flanges at their inner ends, a crosstie bar connecting the bearings at their tops, a crank-equipped spool journaled on the bearings and having one end portion of a fishline wound thereon and at its other end portion extending through an aperture in the crosstie bar, a clamp in the form of an inverted L, the upright section of which extends into a recess in the inner side of one of the flanges and through a hole in the body, a wing-nut screw-threaded on the lower end portion of the clamp and impinging the under side of the body, and a fish pole extending at its outer end portion longitudinally between the flanges with its outer end against the web as a stop, said clamp holding the pole on the body and against the opposite flange.

ALFRED E. PETERSON.

REFERENCES CITED

The following references are of record in the file of this patent:

UNITED STATES PATENTS

| Number | Name | Date |
|---|---|---|
| 481,165 | Darrow | Aug. 23, 1892 |
| 488,678 | Leprohon | Dec. 27, 1892 |
| 1,301,189 | Steen | Apr. 22, 1919 |
| 2,236,305 | Ahlin | Mar. 25, 1941 |
| 2,261,629 | Murphy | Nov. 4, 1941 |
| 2,303,668 | Tilbury | Dec. 1, 1942 |
| 2,340,588 | Groves | Feb. 1, 1944 |
| 2,424,099 | Kell | July 15, 1947 |
| 2,437,779 | Carpentier | Mar. 16, 1948 |